US008341505B2

(12) United States Patent
Tripathi et al.

(10) Patent No.: US 8,341,505 B2
(45) Date of Patent: Dec. 25, 2012

(54) ENFORCING NETWORK BANDWIDTH PARTITIONING FOR VIRTUAL EXECUTION ENVIRONMENTS WITH DIRECT ACCESS TO NETWORK HARDWARE

(75) Inventors: Sunay Tripathi, Palo Alto, CA (US); Christoph Schuba, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 901 days.

(21) Appl. No.: 12/437,695

(22) Filed: May 8, 2009

(65) Prior Publication Data

US 2010/0287455 A1 Nov. 11, 2010

(51) Int. Cl.
*G06F 11/00* (2006.01)
(52) U.S. Cl. ........................................................ 714/779
(58) Field of Classification Search .................... 714/779
See application file for complete search history.

(56) References Cited

U.S. PATENT DOCUMENTS

| 6,041,053 | A | 3/2000 | Douceur et al. |
|---|---|---|---|
| 6,070,219 | A | 5/2000 | McAlpine et al. |
| 6,131,163 | A | 10/2000 | Wiegel |
| 6,163,539 | A | 12/2000 | Alexander et al. |
| 6,477,643 | B1 | 11/2002 | Vorbach et al. |
| 6,600,721 | B2 | 7/2003 | Edholm |
| 6,714,960 | B1 | 3/2004 | Bitar et al. |
| 6,757,731 | B1 | 6/2004 | Barnes et al. |
| 6,831,893 | B1 | 12/2004 | Ben Nun et al. |
| 6,944,168 | B2 | 9/2005 | Paatela et al. |
| 7,046,665 | B1 | 5/2006 | Walrand et al. |
| 7,146,431 | B2 | 12/2006 | Hipp et al. |
| 7,177,311 | B1 | 2/2007 | Hussain et al. |
| 7,313,142 | B2 | 12/2007 | Matsuo et al. |
| 2002/0052972 | A1 | 5/2002 | Yim |
| 2003/0037154 | A1 | 2/2003 | Poggio et al. |
| 2004/0003324 | A1* | 1/2004 | Uhlig et al. ..................... 714/38 |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0210275 | A1* | 9/2005 | Homing et al. ............... 713/190 |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 pages).

(Continued)

*Primary Examiner* — Scott Baderman
*Assistant Examiner* — Jigar Patel
(74) *Attorney, Agent, or Firm* — Osha Liang LLP (57) ABSTRACT

A method for enforcing network bandwidth partitioning. The method includes verifying that a guest driver in a guest operating system (OS) is configured to enforce a resource usage policy, wherein the guest OS resides on a host, mapping a hardware receive ring (HRR) residing on a physical network interface card (NIC) operatively connected to the host to the guest OS, wherein after the mapping the guest OS is configured to receive packets directly from the HRR, determining, using monitoring information, that the guest OS should not receive packets directly from the HRR, and in response to the determination, creating a data path from the HRR to a host OS executing on the host, receiving packets for the guest OS from the HRR by the host OS over the data path, and forwarding the packets from the host OS to the guest OS.

14 Claims, 8 Drawing Sheets

U.S. PATENT DOCUMENTS

| | | | |
|---|---|---|---|
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0174324 | A1 | 8/2006 | Zur et al. |
| 2008/0019365 | A1* | 1/2008 | Tripathi et al. ............... 370/392 |

OTHER PUBLICATIONS

"Solaris Networking—The Magic Revealed (Part I)"; Sunay Tripathi's Solaris Networking Weblog; Nov. 14, 2005, pp. 1-22 (22 pages).

Droux, N.; "Crossbow Virtualization Architecture"; Aug. 28, 2007; Solaris Core OS, Sun Microsystems, Inc.; 51 pages.

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

\* cited by examiner

ENFORCING NETWORK BANDWIDTH PARTITIONING FOR VIRTUAL EXECUTION ENVIRONMENTS WITH DIRECT ACCESS TO NETWORK HARDWARE

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic.

Traditionally, each computer system included a single operating system and one NIC. However, with the advancement in virtualization technology, computer systems may now include multiple concurrently executing operating systems but still include only a single NIC. In such instances, one of the operating systems executing on the computer system may include functionality to regulate how the single NIC is used by the multiple operating systems.

SUMMARY

In general, in one aspect, the invention relates to a computer readable medium having computer executable instructions stored thereon, when executed by a processor, perform a method, the method comprising: verifying that a guest driver in a guest operating system (OS) is configured to enforce a resource usage policy, wherein the guest OS resides on a host; mapping a hardware receive ring (HRR) residing on a physical network interface card (NIC) operatively connected to the host to the guest OS, wherein after the mapping the guest OS is configured to receive packets directly from the HRR; determining, using monitoring information, that the guest OS should not receive packets directly from the HRR; in response to the determination: creating a data path from the HRR to a host OS executing on the host; receiving packets for the guest OS from the HRR by the host OS over the data path; and forwarding the packets from the host OS to the guest OS.

In general, in one aspect, the invention relates to a computer readable medium having computer executable instructions stored thereon, when executed by a processor, perform a method, the method comprising: verifying that a guest MAC layer in a guest operating system (OS) is configured to enforce a resource usage policy, wherein the guest OS resides on a host; mapping a hardware receive ring (HRR) residing on a physical network interface card (NIC) operatively connected to the host to the guest OS, wherein after the mapping the guest OS is configured to receive packets directly from the HRR; determining, using monitoring information, that the guest OS should not receive packets directly from the HRR; in response to the determination: creating a data path from the HRR to a host OS executing on the host; receiving packets for the guest OS from the HRR by the host OS over the data path; and forwarding the packets from the host OS to the guest OS.

In general, in one aspect, the invention relates to a system, comprising a processor, a physical network interface card (NIC) comprising a plurality of hardware receive rings (HRRs), and a host operatively connected to the NIC. The system further comprises a host comprising: a first guest operating system (OS) executing on the host, and a host OS executing on the host. The system further comprises a host OS, executing on the host, configured to verity that a guest driver in the first guest OS is configured to enforce a resource usage policy, map a first HRR of the plurality of HRRs to the first guest OS, wherein after the mapping the first guest OS is configured to receive packets directly from the first HRR determine, using monitoring information, that the first guest OS should not receive packets directly from the first HRR. The host OS is further configured to, in response to the determination that the first guest OS should not receive packets directly from the first HRR, create a first virtual NIC (VNIC) on the host OS, remap the first HRR to the first VNIC, receive packets for the first guest OS from the first HRR to the first VNIC, and forward the packets from the first VNIC to the first guest OS.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to enforcing network bandwidth partitioning for virtual execution environments. More specifically, embodiments of the invention relate to enforcing network bandwidth partitioning for virtual machines with direct access to the NICs.

Embodiments of the invention may enable a host OS to monitor the resources used by a guest OS and an attempt by a guest OS to circumvent a resource usage policy. Further embodiments of the invention may enable a host OS to redirect network traffic from a HRR associated with a guest OS to a virtual interface card associated with the host OS.

Figure 1:
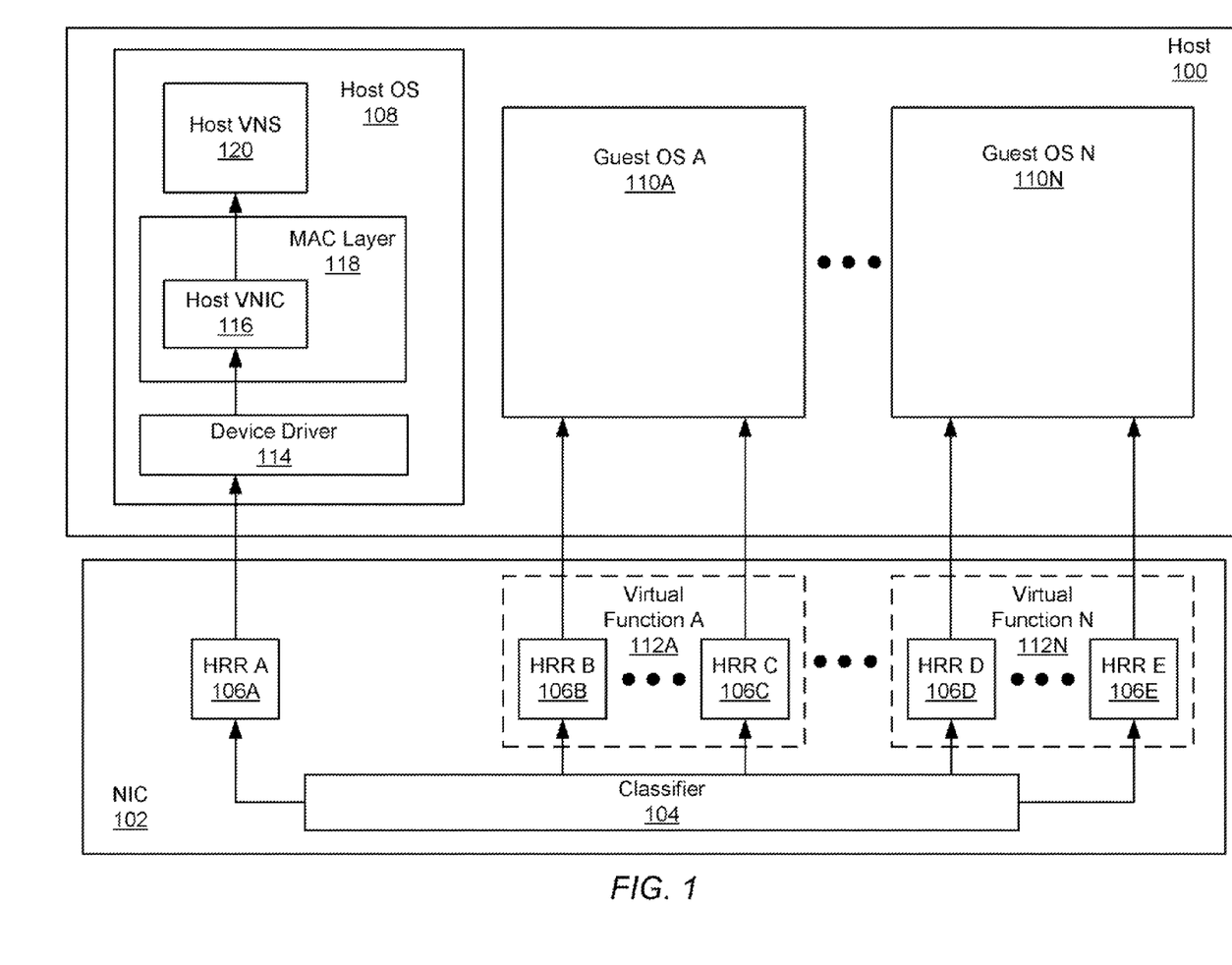
FIG. 1 shows a system in accordance with one or more embodiments of the invention.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (102) for processing, etc. In one embodiment of the invention, the NIC (102) includes a classifier (104) and one or more hardware receive rings (HRRs) (106A, 106B, 106C, 106D, 106E). In one embodiment of the invention, the HRRs (106A, 106B, 106C, 106D, 106E) correspond to portions of memory within the NIC (102) used to temporarily store the received packets. In one embodiment of the invention, the classifier (104) is configured to analyze the incoming network traffic, typically in the form of packets, received from the network (not shown).

In one embodiment of the invention, analyzing the packets by the classifier (104) includes analyzing one or more fields in each of the packets to determine to which of the HRRs (106A, 106B, 106C, 106D, 106E) the packets are forwarded. As an alternative, the classifier (104) may use the contents of one or more fields in each packet as an index into a data structure that includes information necessary to determine to which HRR (106A, 106B, 106C, 106D, 106E) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102). Further, in one embodiment of the invention, the NIC (102) may include a direct memory access (DMA) engine, which includes functionality to transfer packets from the NIC to the host (100).

In one embodiment of the invention, the host (100) includes a host operating system (OS) (108) and one or more guest OSs (110A, 110N). In one embodiment of the invention, the host OS (108) is configured to provide functionality to create virtual environments (e.g., virtual machines) in which the guest OSs may execute. Further, the host OS (108) may include functionality to manage the aforementioned virtual environments. The virtual environments may be provided using well known techniques in the art. An example of virtual execution environment is a Solaris™ Container. In such cases, the Solaris™ Container may execute in the host operating system, which may be a Solaris™ operating system. Solaris™ is a trademark of Sun Microsystems, Inc. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual environments.

In one embodiment of the invention, each virtual execution environment includes functionality to execute an operating system. Further, each virtual execution environment may be isolated such that processes within a virtual execution environment may not communicate with other processes in other virtual execution environments. In addition, each virtual execution environment may be associated with a portion of the total hardware and processing resources of the host.

Continuing with the discussion of FIG. 1, in one embodiment of the invention, a guest OS (110A, 110N) may receive data from a single HRR (106B, 106C, 106D, 106E). In one embodiment of the invention, a guest OS (110A, 110N) may receive data from a plurality of HRRs (106B, 106C, 106D, 106E).

In one embodiment of the invention, at least one of the HRRs (106B, 106C, 106D, 106E) is associated with a virtual function (112A, 112N). In one embodiment, the virtual function (112A, 112N) enables the associated HRRs (106B, 106C, 106D, 106E) to be directly accessible by a guest OS (110A, 110N). More specifically, in one embodiment of the invention, the virtual function (112A, 112N) enables a guest OS (110A, 110N) to directly access the data movement related functions of the HRRs (106B, 106C, 106D, 106E) associated with the virtual function (112A, 112N). Further, the virtual function (112A, 112N) enables the host OS (108) to configure the associated HRRs (106B, 106C, 106D, 106E). More specifically, the virtual function (112A, 112N) may enable the host OS (108) to map or remap the associated HRRs (106B, 106C, 106D, 106E) to a guest OS (110A, 110N). In one embodiment of the invention, each virtual function (112A, 112N) provides an interface between the host OS (108) and one or more HRR (106B, 106C, 106D, 106E) (e.g. virtual function A (112A) may provide a single interface for HRR B (106B) and HRR C (106C)).

In one embodiment of the invention, the host OS (108) may include the following components: a device driver (114), one or more virtual NICs (VNICs) (116), and a host virtual network stack (VNS) (120). In one embodiment of the invention, the device driver (114) provides an interface between one or more HRRs (e.g., 106A) and the host OS (108). More specifically, the device driver (114) exposes one or more HRRs (106A) to the host OS (108).

In one embodiment of the invention, the host VNIC (116) is located within the Media Access Control (MAC) layer (118) of the host OS. In one embodiment of the invention, each host VNIC (116) is associated with one or more HRRs (e.g., 106A). The host VNIC (116) provides an abstraction layer between the NIC (102) and the various packet destinations (not shown) (e.g., containers and/or services) executing on the host OS (108). More specifically, each host VNIC (116) operates like a NIC (102). For example, in one embodiment of the invention, each host VNIC (116) is associated with one or more Internet Protocol (IP) addresses, one or more ports, and configured to handle one or more protocol types. Thus, while the host OS (108) may be operatively connected to a single NIC (102), packet destinations (not shown) (e.g., containers and/or services) executing on the host OS (108) operate as if the host OS (108) is bound to multiple NICs. Said another way, each VNIC (110B, 110C) operates like a separate network device connected to the network.

In one embodiment of the invention, each host VNIC (116) may be operatively connected to a corresponding host VNS (120). In one embodiment of the invention, each host VNS (120) includes functionality to process packets in accordance with various protocols used to send and receive packets (e.g., Transmission Communication Protocol (TCP), Internet Protocol (IP), User Datagram Protocol (UDP), etc.). Each host VNS (120) may also include functionality to send and receive packets from an associated host VNIC (116). Further, each host VNS (120) may also include functionality to send and receive packets from one or more associated packet destinations (not shown).

In one embodiment of the invention, each host VNS (120) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, the host OS (108) includes a resource usage policy. The resource usage policy specifies how the NIC bandwidth is distributed across the host OS (108) and the various guest OSs (110A, 110N). For example, the resource usage policy may specify (i) a maximum bandwidth for each OS (host and guest), (ii) a uniform bandwidth for each guest OS, (iii) a maximum bandwidth for each OS (host and guest) for various times during a 24-hour period, and/or (iv) a maximum bandwidth for each OS (host and guest) for various time/days in a 7-day period. Those skilled in the art will appreciate that the resource utilization policy is not limited to the examples listed above.

Figure 2:
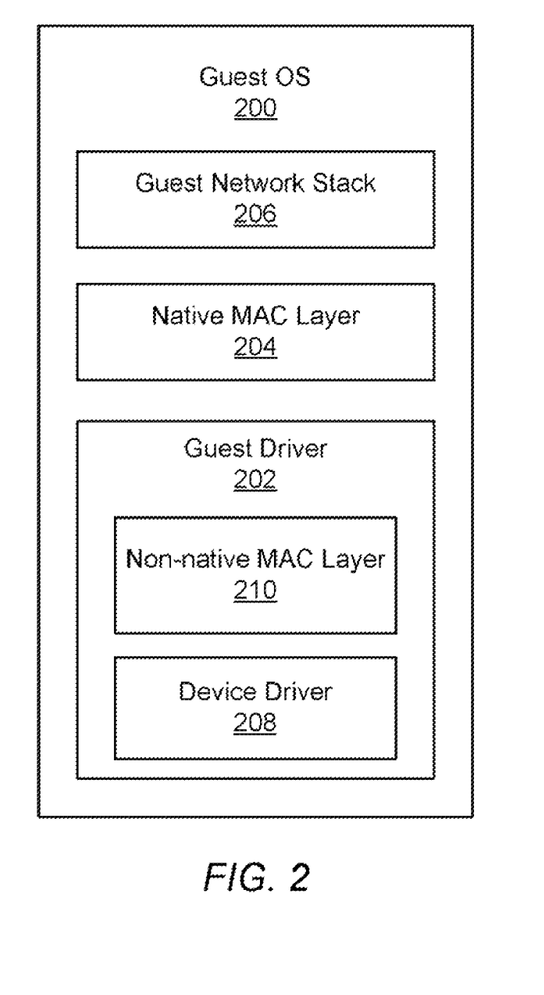
FIG. 2 shows a guest operating system in accordance with one or more embodiments of the invention.

FIG. 2 shows a guest OS in accordance with one embodiment of the invention. As shown in FIG. 2, the guest OS (200) may include a guest driver (202), a native MAC layer (204), and a guest network stack (206). Further, the guest driver (202) may include a device driver (208) and a non-native MAC layer (210). Each of these components is described below. Those skilled in the art will appreciate that the guest OS may include further elements not shown in FIG. 2.

In one embodiment of the invention, the guest driver (202) provides an interface between the HRRs (106A, 106B, 106C, 106D, 106E in FIG. 1) and the guest OS (200). In one embodiment of the invention, the native MAC layer (204) and other elements on the guest OS (200) interact with the guest driver (202) in the same manner they would interact with any other device driver. In one embodiment of the invention, the guest driver (202) is configured to communicate with the corresponding HRR (106B, 106C, 106D, 106E in FIG. 1) residing on a NIC (102 in FIG. 1) using the corresponding virtual functions (112A, 112N in FIG. 1). More specifically, the device driver (208) within the guest driver (202) is configured to transfer packets using one or more virtual functions (112A, 112N in FIG. 1) to and from the corresponding HRRs (106B, 106C, 106D, 106E in FIG. 1). In one embodiment of the invention, packets are received by the device driver (208) and forwarded to the non-native MAC layer (210).

In one embodiment of the invention, the non-native MAC layer (210) includes functionality to regulate the flow of packets into the guest OS (200). More specifically, the non-native MAC layer (210) includes functionality to regulate the network bandwidth used by the guest OS (200). In one embodiment of the invention, the non-native MAC layer (210) may regulate bandwidth by limiting the number of packets retrieved from the corresponding HRR in a given period of time (e.g., X packets/second, X bytes/sec), X MB/sec, etc.).

The non-native MAC layer (210) may regulate the bandwidth using a polling mechanism, which allows the non-native MAC layer (210) to request a specified number of packets from the corresponding HRR within a given period of time. One embodiment for implementing a polling mechanism is disclosed in U.S. Pat. No. 7,499,463, which is assigned to the assignee of the instant patent application.

In another embodiment, packets may be transferred from the NIC to the guest OS (200) using interrupts issued from the NIC when the rate at which packets are received for the guest OS are below the maximum bandwidth specified in the resource usage policy (or below another specified bandwidth which is less than the maximum bandwidth specified in the resource usage policy). When the rate at which packets are received approaches the maximum bandwidth specified in the resource usage policy (or specified bandwidth which is less than the maximum bandwidth specified in the resource usage policy), the packets may be transferred using the polling mechanism.

In one embodiment of the invention the non-native MAC layer (210) is configured to regulate the flow of packets into the guest OS (200) in accordance with the resource usage policy. Configuring the non-native MAC layer (210) may include setting one or more configuration parameters related to the rate at which packets are transmitted from the NIC to the guest OS (200). These configuration parameters may be set prior to the installation of the guest driver (202) into the guest OS (200). Alternatively, or in addition to, the configuration parameters may be set and/or modified at runtime.

Returning to FIG. 2, from the perspective of the native MAC layer (204), the packets received from the guest driver (202) are in a format that the native MAC layer (204) expects from any other equivalent driver. Said another way, the native MAC layer (204) is not aware that the packets received from the guest driver (202) have been processed by the non-native MAC layer (210).

Figure 3:
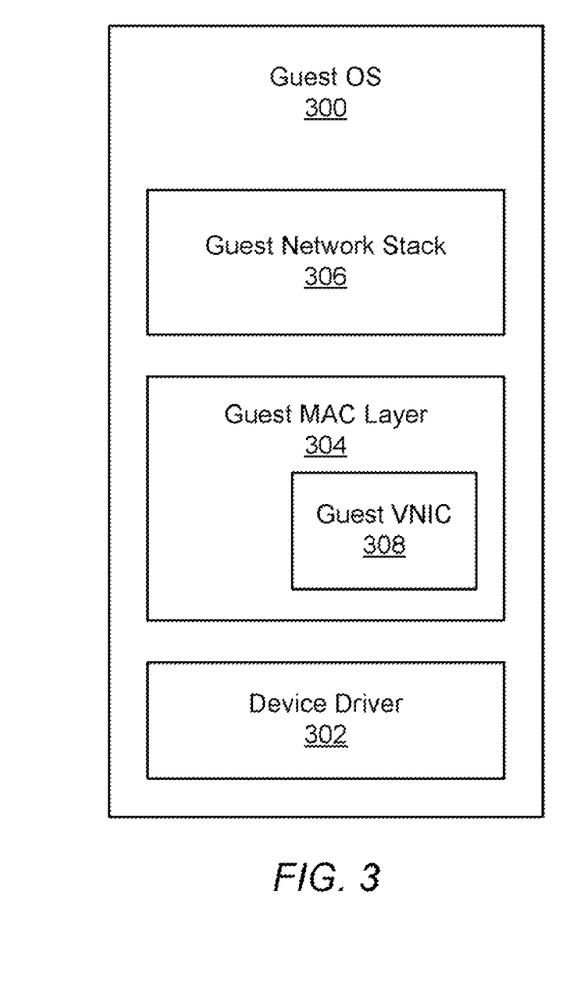
FIG. 3 shows a guest operating system in accordance with one or more embodiments of the invention.

FIG. 3 shows a guest OS in accordance with one embodiment of the invention. In one embodiment of the invention, the guest OS (300) includes a device driver (302), a guest MAC layer (304), and a guest network stack (306). Each of these components is described below. Those skilled in the art will appreciate that the guest OS may include further elements not shown in FIG. 3.

The guest MAC layer (304) may include a guest VNIC (308). In one embodiment of the invention, the device driver (302) is configured to operate in the same manner as device driver (208). In one embodiment of the invention, packets are received by the device driver (302) using one or more virtual functions (112A, 112N in FIG. 1) and forwarded to the guest VNIC (308) on the guest MAC layer (304). Packets received by the guest VNIC (308) on the guest MAC layer (304) are processed and forwarded to the guest network stack (306). The guest VNIC (308) includes the same functionality as described above with respect to VNICs in FIG. 1. Further, the guest MAC layer (304) includes the same functionality with respect to the regulation of network bandwidth as non-native MAC layer (210) in FIG. 2.

In one embodiment of the invention the guest MAC layer (304) is configured to regulate the flow of packets into the guest OS (300) in accordance with the resource usage policy. Configuring the guest MAC layer (304) may include setting one or more configuration parameters related to the rate at which packets are transmitted from the NIC to the guest OS. These configuration parameters may be set prior to the installation of the guest OS. Alternatively, or in addition to, the configuration parameters may be set and/or modified anytime after the guest OS has been installed on the host.

In another embodiment of the invention, an unconfigured guest OS (i.e., a guest OS that does not include a guest MAC layer configured to enforce the resource usage policy) may be loaded on to the host. Subsequently, the portions of the binary corresponding to the MAC layer of the unconfigured guest OS may overwritten by a configured guest MAC layer (e.g., guest MAC layer (304)).

As discussed above, the guest driver (202) (and in particular the non-native MAC layer (210) in the guest driver) and the guest MAC layer (304) include functionality to enforce the resource usage policy. In order to ensure that the mechanisms implemented in the guest driver (202) and guest MAC layer (304) are not circumvented by processes executing the guest OSs (i.e., the guest OS is not able to obtain resources in excess of the resources allocated to the guest OS as specified in the resource usage policy), the following mechanisms shown in FIGS. 4A and 4B may be implemented.

Figure 4A:
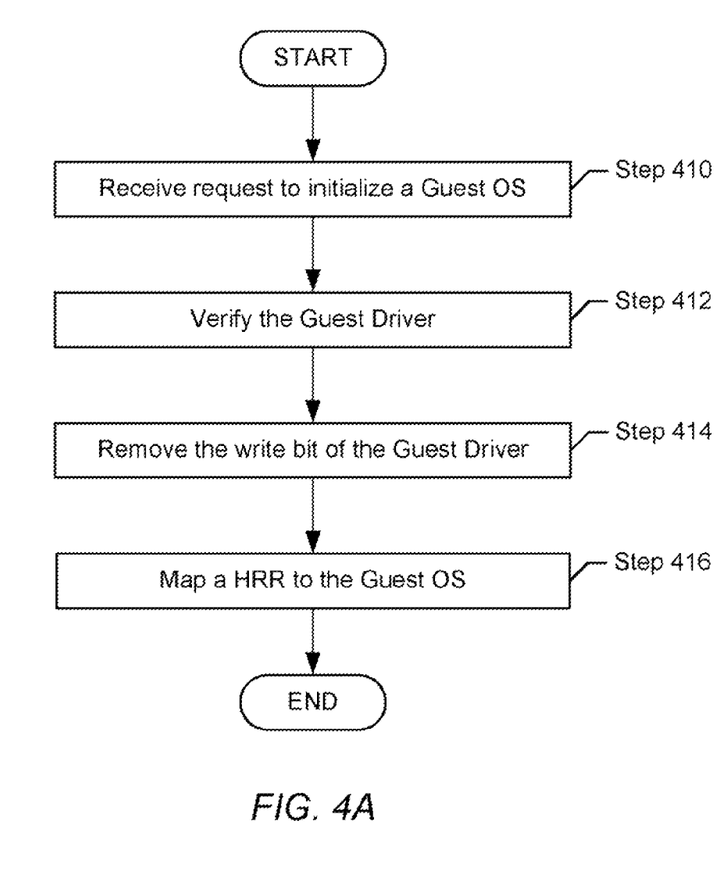
FIG. 4A shows an flowchart in accordance with one or more embodiments of the invention.

FIG. 4A shows a flow chart for initializing a guest OS and a HRR in accordance with one or more embodiments of the invention. In one or more embodiments of the invention, one or more of the steps shown in FIG. 4A may be omitted, repeated, and/or performed in a different order than that shown in FIG. 4A. Accordingly, the specific arrangement of steps shown in FIG. 4A should not be construed as limiting the scope of the invention.

In Step 410, a request is received to initialize a guest OS. In one embodiment of the invention, the request to initialize the guest OS corresponds to an initial login of the guest OS. In Step 412, the host OS verifies the guest driver (e.g., 202 in FIG. 2). In one embodiment of the invention, verifying the guest driver includes (i) calculating a checksum of the guest driver using a checksum algorithm (e.g., SHA-1, etc.) and the binary of the guest driver installed in the guest OS and (ii) comparing the calculated checksum to a previously calculated checksum of the guest driver (e.g., a checksum previously calculated by the host OS or another third-party). In one embodiment of the invention, Step 412 is performed in order to verify that the guest driver (which is configured to enforce the resource usage policy) has not been altered.

In Step 414, the write bit is removed from the guest driver. In one embodiment of the invention, removing the write bit includes altering the permissions of one or more pages in memory in which the file associated with the guest driver is loaded. In one embodiment of the invention, Step 414 is performed in order to provide a mechanism to detect runtime attempts to alter the guest driver. In Step 416, one or more HRRs are mapped to the guest OS using one or more virtual functions.

Figure 4B:
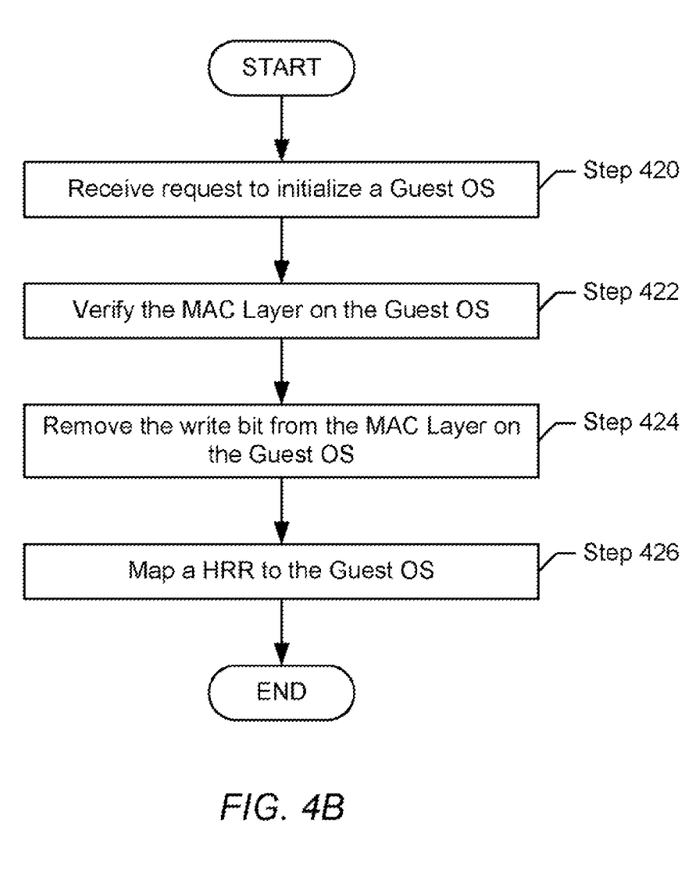
FIG. 4B shows an flowchart in accordance with one or more embodiments of the invention.

FIG. 4B shows a flow chart for initializing a guest OS in accordance with one or more embodiments of the invention. In one or more embodiments of the invention, one or more of the steps shown in FIG. 4B may be omitted, repeated, and/or performed in a different order than that shown in FIG. 4B. Accordingly, the specific arrangement of steps shown in FIG. 4B should not be construed as limiting the scope of the invention.

In Step 420, a request is received to initialize a guest OS. In one embodiment of the invention, the request to initialize the guest OS corresponds to an initial login of the guest OS. In Step 422, the host OS verifies the guest MAC layer (e.g., 304 in FIG. 3). In one embodiment of the invention, verifying the guest MAC layer includes (i) calculating a checksum of the guest MAC layer using a checksum algorithm (e.g., SHA-1, etc.) and the binary of the guest MAC layer in the installed guest OS and (ii) comparing the calculated checksum to a previously calculated checksum of the guest MAC layer (e.g., a checksum previously calculated by the host OS or another third-party). In one embodiment of the invention, Step 422 is performed in order to verify that the guest MAC layer (which is configured to enforce the resource usage policy) has not been altered.

In Step 424, the write bit is removed from the guest MAC layer on the guest OS. In one embodiment of the invention, removing the write bit includes altering the permissions of one or more pages in memory in which the file associated with the guest MAC layer is loaded. In one embodiment of the invention, Step 414 performed in order to provide a mechanism to detect runtime attempts to alter the guest MAC layer. In Step 426, one or more HRRs are mapped to the guest OS using one or more virtual functions.

Figure 5:
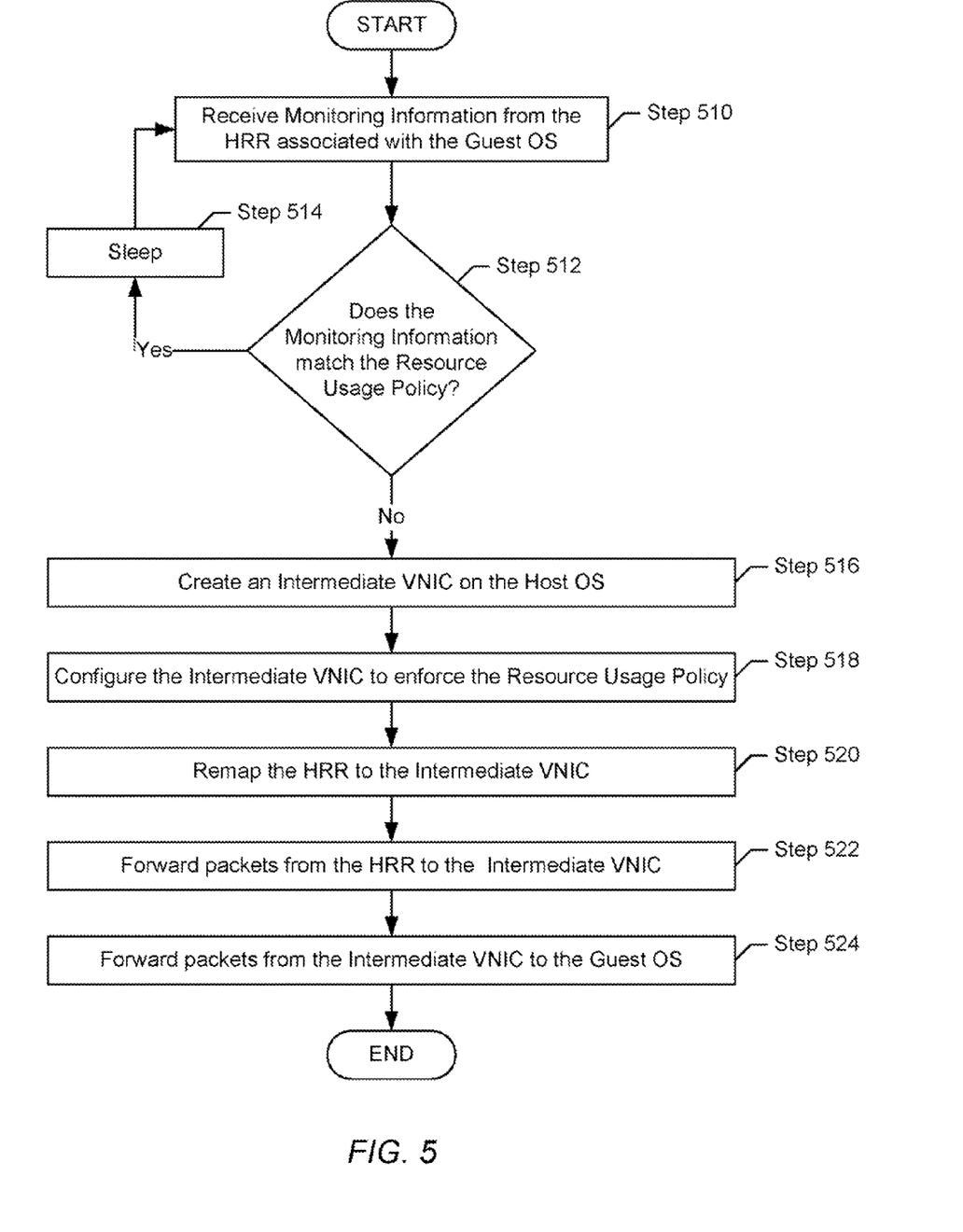
FIG. 5 shows a flowchart in accordance with one or more embodiments of the invention.

FIG. 5 shows a flow chart for monitoring and reconfiguring a HRR in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

In Step 510, the host OS receives monitoring information from a HRR associated with a guest OS. In one embodiment of the invention, receiving monitoring information includes receiving statistics associated with one or more HRRs through which packets for the guest OSs are transmitted. In one embodiment of the invention, the host OS may include various interfaces to obtain statistics from the HRRs. Further, monitoring information may be obtained by tracking pages faults generated by the various guest OSs. Examples of monitoring information may include, but are not limited to, total number of packets received, average number of packets received over a specified period of time (e.g., average packets/sec), total number of bytes received, and average number of bytes received over a specified period of time (e.g., average bytes/sec), current bandwidth utilization (e.g., packets/sec, bytes/sec, etc.), whether a page fault error has been generated in response to an attempt by guest OS to write to the guest driver/guest MAC layer, etc.

In Step 512, the host OS determines whether the monitoring information matches (or otherwise conforms to) the resource usage policy. If the monitoring information matches the resource usage policy, then, in Step 514, the host OS waits to receive more monitoring information. If the monitoring information does not match the resource usage policy, then the process proceeds to Step 516.

In Step 516, the host OS creates an intermediate VNIC. In one embodiment of the invention, the intermediate VNIC is created within the MAC layer of the host OS. In Step 518, the host OS configures the intermediate VNIC to enforce the resource usage policy, for example, by processing packets at a rate below the maximum rate allowed by the resource usage policy. In Step 520, the host OS remaps the HRR associated with the guest OS to the intermediate VNIC. In Step 522, packets are forwarded from the HRR to the intermediate VNIC (instead of being forwarded directly from the HRR to the guest OS). In Step 524, packets are forwarded from the intermediate VNIC to the guest OS.

Figure 6:
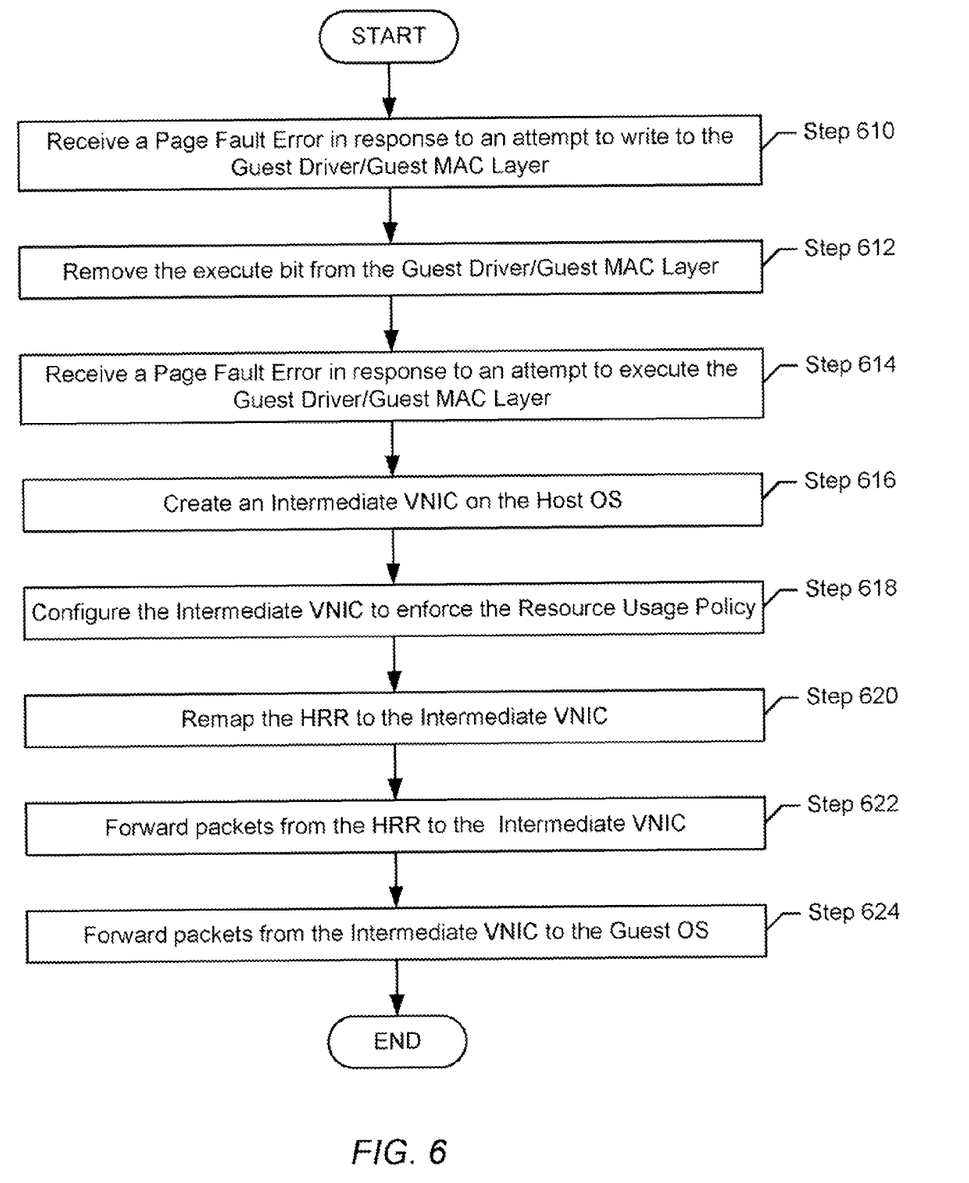
FIG. 6 shows a flowchart in accordance with one or more embodiments of the invention.

FIG. 6 shows a flow chart for monitoring and reconfiguring a HRR in accordance with one or more embodiments of the invention. In one or more embodiments of the invention, one or more of the steps shown in FIG. 6 may be omitted, repeated, and/or performed in a different order than that shown in FIG. 6. Accordingly, the specific arrangement of steps shown in FIG. 6 should not be construed as limiting the scope of the invention.

In Step 610, the host OS receives a page fault error in response to an attempt to write to the guest driver/guest MAC layer by a non-host OS process. In one embodiment of the invention, the page fault is a protection fault and is triggered based on the prior configuration of the write bit (see Step 412, Step 424). In one embodiment of the invention, the page fault, is recorded in the monitoring information.

In Step 612, in response to the page fault in Step 610, the host OS removes the execute bit from the guest driver/guest MAC layer. In one embodiment of the invention, the execute bit is removed from one or more pages in memory in which the file associated with the guest driver/guest MAC layer is loaded. In Step 614, the host OS receives a subsequent page fault error in response to an attempt to execute to the guest driver/guest MAC layer by a non-host OS process. In one embodiment of the invention, the subsequent page fault is recorded in the monitoring information.

In Step 616, the host OS creates an intermediate VNIC. In one embodiment of the invention, the intermediate VNIC is created within the MAC layer of the host OS. In Step 618, the host OS configures the intermediate VNIC to enforce the resource usage policy, by for example, processing packets at a rate below the maximum rate allowed by the resource usage policy. In Step 620, the host OS remaps the HRR associated with the guest OS to the intermediate VNIC. In Step 622, packets are forwarded from the HRR to the intermediate VNIC (instead of being forwarded directly from the HRR to the guest OS). In one embodiment of the invention, the methods shown in FIGS. 5 and 6 may be performed concurrently on the host.

Figure 7A:
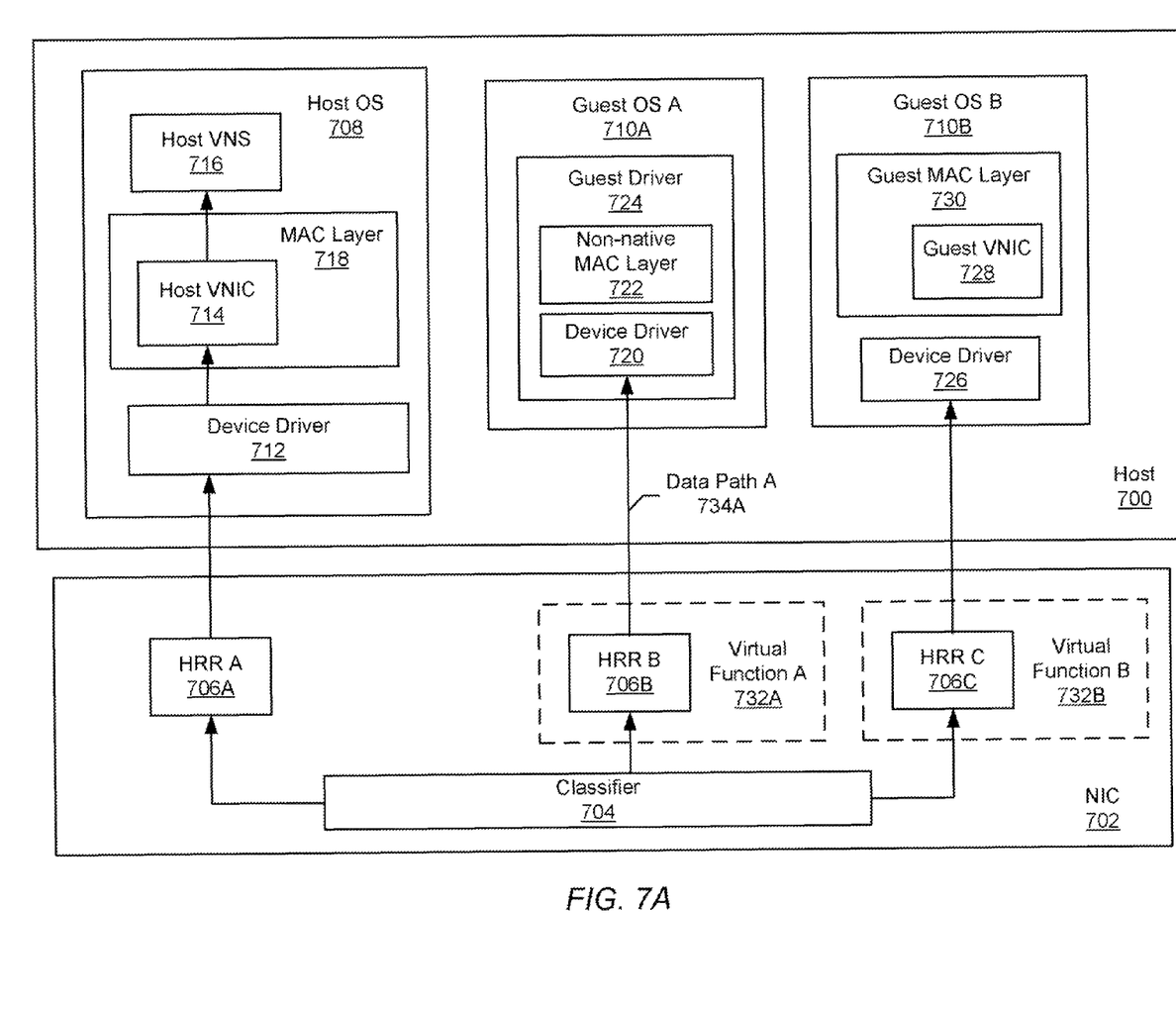
FIG. 7A shows an example in accordance with one or more embodiments of the invention.

FIG. 7A shows an exemplary system in accordance with one embodiment of the invention. The exemplary system is not intended to limit the scope of the invention. FIG. 7A illustrates an embodiment of the invention after some or all of the steps listed in FIG. 4A and FIG. 4B have been executed.

The example system in FIG. 7A includes a host (700) operatively connected to a physical NIC (702). The NIC (702) includes a classifier (704), and three HRRs (706A, 706B, 706C). The host (700) includes a host OS (708), guest OS A (710A), and guest OS B (710B). The host OS (708) includes a device driver (712), a host VNIC (714), and a host VNS (716). The host VNIC (714) is implemented within the MAC layer (718) of the host.

As depicted in the exemplary system of FIG. 7A, guest OS A (710A) includes a device driver (720) and a non-native MAC layer (722). The device driver (720) and the non-native MAC layer (722) are implemented within the guest driver (724). Guest OS B (710B) includes a device driver (726) and a guest VNIC (728). The guest VNIC (728) is implemented within the guest MAC layer (730).

The guest driver (724) associated with guest OS A (710A) has been verified and configured using the steps in FIG. 4A. Guest OS A (710A) has been assigned HRR B (706B), and receives data (typically in the form on packets) directly through HRR B (706B) utilizing virtual function A (732A). Guest OS B (710B) has been verified and configured using the steps in FIG. 4B. Guest OS B (710B) has been assigned HRR C (706C), and receives data (typically in the form on packets) directly through HRR C (706C) utilizing virtual function B (732B).

Data (typically in the form on packets) addressed to guest OS A (710A) is received by the NIC (702) and sent to the classifier (704). The classifier (704) determines which HRR (706A, 706B, 706C) is to receive the data. Data addressed to guest OS A (710A) is forwarded to HRR B (706B). HRR B (706B) forwards packets directly to the device driver (720) on guest. OS A (710A) via data path A (734A). Data received by the device driver (720) on guest OS A (710A) is processed by the non-native MAC layer (722). The data is then presented to guest OS A (710A) via the guest driver (724). The host OS (708) monitors the guest OSs (710A, 710B) to obtain monitoring information.

Figure 7B:
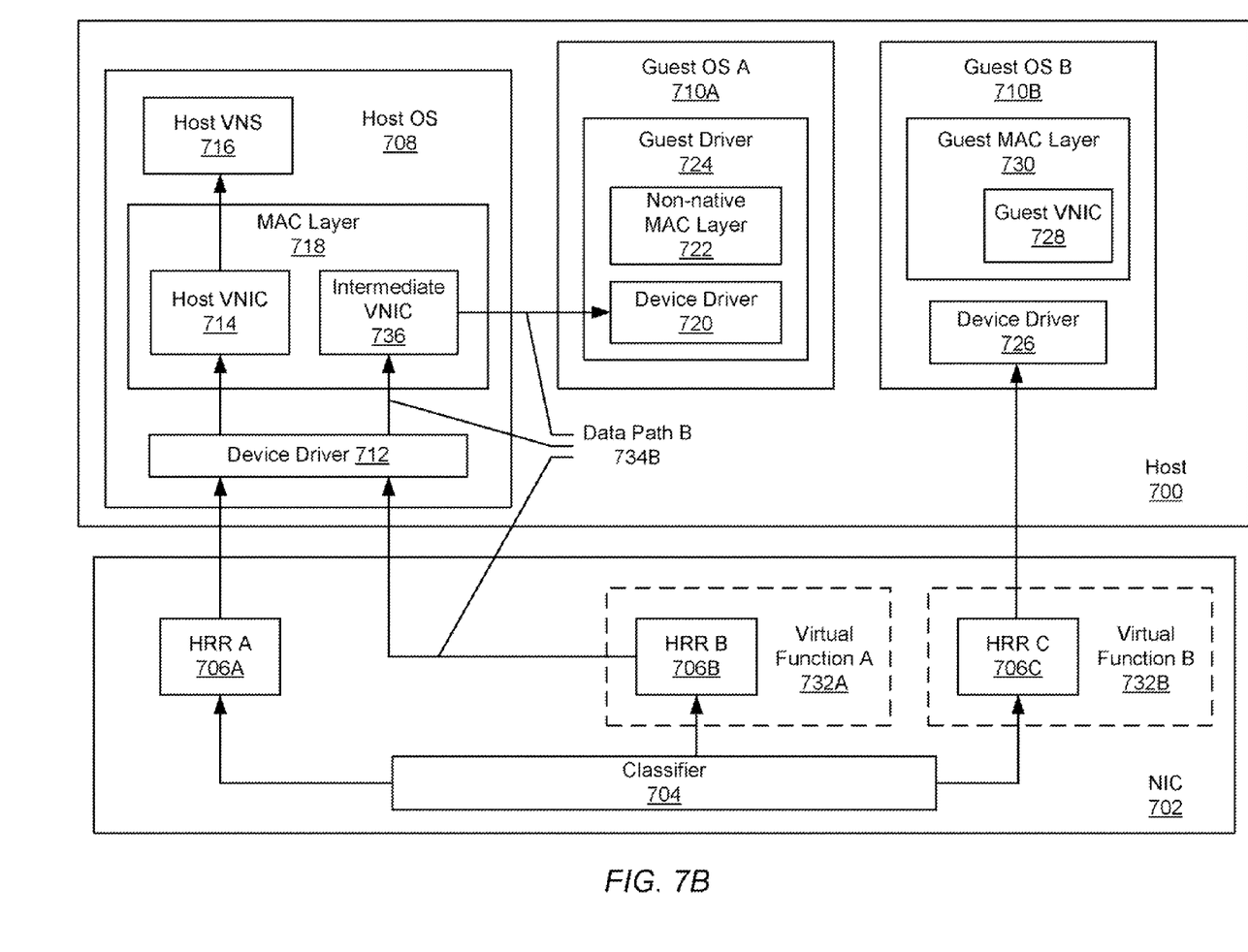
FIG. 7B shows an example in accordance with one or more embodiments of the invention.

FIG. 7B shows an exemplary system in accordance with one embodiment of the invention. The exemplary system is not intended to limit the scope of the invention. FIG. 7B illustrates an embodiment of the invention after some or all of the steps listed in FIG. 5 and FIG. 6 have been executed.

Assume for purposes of this example, that the monitoring information for guest OS A (710A) indicates that guest OS A (710A) has exceed the maximum allocated bandwidth as defined in the resource usage policy. Those skilled in the art will appreciate that the monitoring information may have also recorded page faults related to write attempts to the pages on which the guest driver (724) is loaded.

Based on this, the host OS (708) reconfigures the flow of packets to guest OS A (710A) as shown in FIG. 7B. Specifically, as depicted in example FIG. 7B, a data path (734B) from HRR B (706B), through the host OS (708), to guest OS A (710A) has been created. Additionally, an intermediate VNIC (736) has been created on the host OS (708) along the data path (734B). The intermediate VNIC (736) has been configured to enforce the resource usage policy associated with guest OS A (710A). The intermediate VNIC (736) may be configured to enforce the resource usage policy, or may be configured to enforce a separate usage policy (which may be variation of the resource usage policy discussed in FIG. 7A). In addition, data path A (734A on FIG. 7A) has been terminated (i.e., packets may no longer be transmitted on data path A).

After the reconfiguration, packets received by HRR B (706B) are forwarded to the device driver (712) via data path B (734B). Packets addressed to guest OS A (710A) are forwarded by the host OS (708) to the intermediate VNIC (736). The intermediate VNIC (736) forwards packets received from the host OS (708) to the device driver associated with guest OS A (710A). Guest OS A (710A) may not be aware that the path from HRR B (706B) to the guest OS device driver (720) has been altered.

Those skilled in the art will appreciated that while the above example describes data paths implemented using VNICs, the data path may be implemented using other software and/or hardware with functionality to transmit packets along the same or equivalent data paths described above. More specifically, data path A (and any other equivalent data paths) may be created using software and/or hardware to transmit packets from the NIC to the guest OS. Further, data path B (and any other equivalent data paths) may be created using software and/or hardware to transmit packets from the NIC to Host OS to Guest OS.

Those skilled in the art will appreciate that while the above invention has been described with respect to HRRs and the transfer of data between the host and the NIC using the HRRs, the NIC may also include transmit rings. In such instances, data received by the NIC from the network may be sent to the HRRs while data received by the NIC from any of the OSs on the host may utilize transmit rings. In one embodiment of the invention, the transmit rings include the same functionality as the HRRs. Further, virtual functions may be used to transmit data from the OSs on the host to the corresponding transmit rings.

Figure 8:
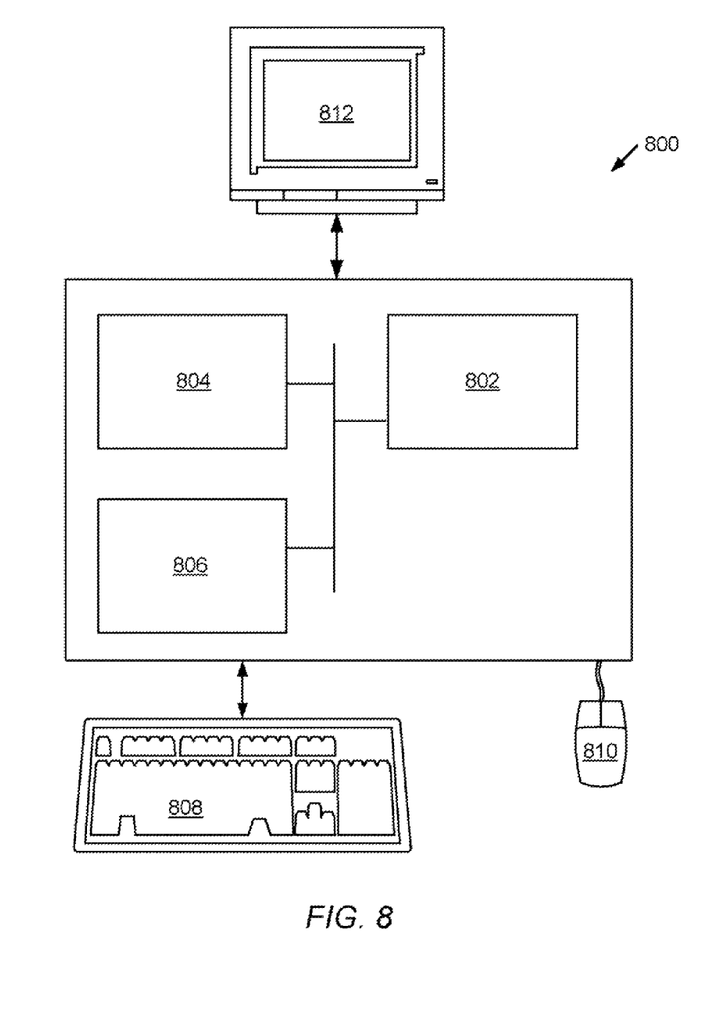
FIG. 8 shows a computer system in accordance with one or more embodiments of the invention.

An embodiment, of the invention may be implemented on virtually any type of computer regardless of the platform being used. For example, as shown in FIG. 8, a networked computer system (800) includes a processor (802), associated memory (804), a storage device (806), and numerous other elements and functionalities typical of today's computers (not shown). The networked computer (800) may also include input means, such as a keyboard (808) and a mouse (810), and output means, such as a monitor (812). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium having computer executable instructions stored thereon, when executed by a processor, perform a method, the method comprising:
verifying that a guest driver in a guest operating system (OS) is configured to enforce a resource usage policy, wherein the guest OS resides on a host;
mapping a hardware receive ring (HRR) residing on a physical network interface card (NIC) operatively connected to the host to the guest OS, wherein after the mapping the guest OS is configured to receive packets directly from the HRR;
removing a write bit from a page in a memory of the host on which the guest driver is loaded;
determining, using monitoring information, that the guest OS should not receive packets directly from the HRR, wherein determining, using the monitoring information, that the guest OS should not receive packets directly from the HRR comprises:
receiving a first page fault error sent in response to an attempt to write to the page, wherein the first page fault is recorded in the monitoring information;
removing an execute bit associated with the page; and
receiving, after removing the execute bit, a second page fault error sent in response to an attempt to execute the guest driver, wherein the second page fault is recorded in the monitoring information;
in response to the determination:
creating a data path from the HRR to a host OS executing on the host;
receiving packets for the guest OS from the HRR by the host OS over the data path; and
forwarding the packets from the host OS to the guest OS.

2. The non-transitory computer readable medium of claim 1, wherein the data path comprises a virtual NIC (VNIC) executing on the host OS.

3. The non-transitory computer readable medium of claim 2, wherein the VNIC is configured to enforce the resource usage policy.

4. The non-transitory computer readable medium of claim 1, wherein the resource usage policy specifies at least one selected from a group comprising a maximum number of packets received for the guest OS within the unit of time and a maximum number of bytes received for the guest OS within the unit of time.

5. The non-transitory computer readable medium of claim 1, wherein verifying that the guest driver in the guest OS is configured to enforce the resource usage policy comprises:
calculating a first checksum using a checksum algorithm and a binary corresponding to the guest driver in the guest OS; and
comparing the first checksum with a previously calculated second checksum stored on the host, wherein the second checksum is calculated using the checksum algorithm and a binary corresponding to the guest driver prior to installing the guest driver in the guest OS.

6. A non-transitory computer readable medium having computer executable instructions stored thereon, when executed by a processor, perform a method, the method comprising:
verifying that a guest MAC layer in a guest operating system (OS) is configured to enforce a resource usage policy, wherein the guest OS resides on a host;
mapping a hardware receive ring (HRR) residing on a network interface card (NIC) operatively connected to the host to the guest OS, wherein after the mapping the guest OS is configured to receive packets directly from the HRR;
removing a write bit from a page in a memory of the host on which the guest MAC layer is loaded;
determining, using monitoring information, that the guest OS should not receive packets directly from the HRR, wherein determining, using the monitoring information, that the guest OS should not receive packets directly from the HRR comprises:
receiving a first page fault error sent in response to an attempt to write to the page, wherein the first page fault is recorded in the monitoring information;
removing an execute bit associated with the page; and
receiving, after removing the execute bit, a second page fault error sent in response to an attempt to execute the guest MAC layer, wherein the second page fault is recorded in the monitoring information;
in response to the determination:
creating a data path from the HRR to a host OS executing on the host;
receiving packets for the guest OS from the HRR by the host OS over the data path; and
forwarding the packets from the host OS to the guest OS.

7. The non-transitory computer readable medium of claim 6, wherein the data path comprises a virtual NIC (VNIC) executing on the host OS.

8. The non-transitory computer readable medium of claim 7, wherein the VNIC is configured to enforce the resource usage policy.

9. The non-transitory computer readable medium of claim 6, wherein the resource usage policy specifies at least one selected from a group comprising a maximum number of packets received for the guest OS within the unit of time and a maximum number of bytes received for the guest OS within the unit of time.

10. The non-transitory computer readable medium of claim 6, wherein verifying that the guest MAC layer in the guest OS is configured to enforce the resource usage policy comprises:
calculating a first checksum using a checksum algorithm and a binary corresponding to the guest MAC layer in the guest OS; and
comparing the first checksum with a previously calculated second checksum stored on the host, wherein the second checksum is calculated using the checksum algorithm and a binary corresponding to the guest MAC layer prior to installing the guest OS.

11. A system for enforcing network bandwidth partitioning comprising:
a processor;
a physical network interface card (NIC) comprising a plurality of hardware receive rings (HRRs); and
a host, operatively connected to the NIC, comprising:
a first guest operating system (OS) executing on the host;
a host OS executing on the host and configured to:
verify that a guest driver in the first guest OS is configured to enforce a resource usage policy;
map a first HRR of the plurality of HRRs to the first guest OS, wherein after the mapping the first guest OS is configured to receive packets directly from the first HRR;
remove a write bit from a page in a memory of the host on which the guest driver is loaded;
determine, using monitoring information, that the first guest OS should not receive packets directly from the first HRR, wherein determining, using the monitoring information, that the first guest OS should not receive packets directly from the first HRR comprises:
  receiving a first page fault error sent in response to an attempt to write to the page, wherein the first page fault is recorded in the monitoring information;
  removing an execute bit associated with the page; and
    receiving, after removing the execute bit, a second page fault error sent in response to an attempt to execute the guest driver, wherein the second page fault is recorded in the monitoring information;
  in response to the determination that the first guest OS should not receive packets directly from the first HRR:
    create a first virtual NIC (VNIC) on the host OS;
    remap the first HRR to the first VNIC;
    receive packets for the first guest OS from the first HRR to the first VNIC; and
    forward the packets from the first VNIC to the first guest OS.

12. The system of claim 11, wherein the host further comprises:
  a second guest OS executing on the host,
  wherein the host OS is further configured to:
    verify that a guest MAC layer in the second guest OS is configured to enforce the resource usage policy;
    map a second HRR of the plurality of HRRs to the second guest OS, wherein after the mapping the second guest OS is configured to receive packets directly from the second HRR;
    determine, using monitoring information, that the second guest OS should not receive packets directly from the second HRR
    in response to the determination that the second guest OS should not receive packets directly from the second HRR:
      create a second VNIC on the host OS;
      remap the second HRR to the second VNIC;
      receive packets for the second guest OS from the second HRR to the second VNIC; and
      forward the packets from the second VNIC to the second guest OS.

13. The system of claim 11, wherein the first VNIC and the second VNIC are configured to enforce the resource usage policy.

14. The system of claim 11, wherein verifying that the guest driver in the first guest OS is configured to enforce the resource usage policy comprises:
  calculating a first checksum using a checksum algorithm and a binary corresponding to the guest driver in the first guest OS; and
  comparing the first checksum with a previously calculated second checksum stored on the host, wherein the second checksum is calculated using the checksum algorithm and a binary corresponding to the guest driver prior to installing the guest driver in the first guest OS.

* * * * *